US012722540B2

(12) United States Patent
Yoon et al.

(10) Patent No.: US 12,722,540 B2
(45) Date of Patent: Sep. 1, 2026

(54) WALK-IN DEVICE FOR VEHICLE SEAT

(71) Applicant: Hyundai Transys Inc., Seosan-si (KR)

(72) Inventors: Cheolhwan Yoon, Hwaseong-si (KR); Hwa Young Mun, Hwaseong-si (KR); Gwon Hwa Bok, Hwaseong-si (KR); Seong Jun Shin, Hwaseong-si (KR); Han Yun Choi, Hwaseong-si (KR); Junsik Hwang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 92 days.

(21) Appl. No.: 18/901,688

(22) Filed: Sep. 30, 2024

(65) Prior Publication Data

US 2025/0121744 A1 Apr. 17, 2025

(30) Foreign Application Priority Data

Oct. 12, 2023 (KR) ........................ 10-2023-0135838

(51) Int. Cl.
*B60N 2/12* (2006.01)

(52) U.S. Cl.
CPC ...................................... *B60N 2/12* (2013.01)

(58) Field of Classification Search
CPC .......... B60N 2/12; B60N 2/08; B60N 2/0818; B60N 2/20; B60N 2/06
USPC ........................................................ 297/341
See application file for complete search history.

(56) References Cited

U.S. PATENT DOCUMENTS 5,740,999 A * 4/1998 Yamada ................ B60N 2/085 248/419
2009/0058169 A1* 3/2009 Soga .................... B60N 2/0705 297/463.1

FOREIGN PATENT DOCUMENTS

DE 102018205481 A1 * 10/2019 ............. B60N 2/236
KR 10-2009-0025599 A 3/2009
KR 10-2446336 B1 9/2022
KR 10-2022-0143298 A 10/2022
KR 10-2023-0064716 A 5/2023

* cited by examiner

*Primary Examiner* — Sarah B Mcpartlin
(74) *Attorney, Agent, or Firm* — Bridgeway IP Law Group, PLLC; Jihun Kim

(57) ABSTRACT

A walk-in device for a vehicle seat includes a rear link having one end connected to a seat cushion frame by a first hinge shaft, and the other end connected to an upper rail by a second hinge shaft, the rear link being capable of rotating in an unlocking direction about the second hinge shaft, and an unlocking device configured to operate in conjunction with a rotational operation of the rear link and implement an unlocked state by pressing a locking pin by means of operations of a plurality of links.

10 Claims, 6 Drawing Sheets

WALK-IN DEVICE FOR VEHICLE SEAT

CROSS-REFERENCE TO RELATED APPLICATIONS

This application claims priority to and the benefit of Korean Patent Application No. 10-2023-0135838 filed in the Korean Intellectual Property Office on Oct. 12, 2023, the entire contents of which are incorporated herein by reference.

TECHNICAL FIELD

The present invention relates to a walk-in device for a vehicle seat.

BACKGROUND ART

In general, a walk-in device for a vehicle seat, which is capable of performing a walk-in function, may be mounted in a front seat of a recreational vehicle (RV) or a three-door vehicle to allow a rear seat passenger to get in or out of the vehicle.

The walk-in function refers to a function of folding a seatback of the front seat forward at a predetermined angle and simultaneously sliding the front seat forward by a predetermined distance when the rear seat passenger operates a walk-in switch of the front seat. A space may be ensured between the front seat and the rear seat by the walk-in function, and a passenger may get in or out of the vehicle through the ensured space.

In the case of the walk-in device for a vehicle seat in the related art, a rear link may be unrestrained when the passenger operates the walk-in switch. When the rear link is unrestrained, the rear link elastically supported by an elastic member may be rotated by an elastic restoring force of the elastic member. A locking pin may be pressed and unlocked by the operation of the rear link. Therefore, an upper rail may move along a lower rail.

However, in the case of the walk-in device for a vehicle seat in the related art, the locking pin is not completely unlocked by being pressed by a pressing bracket when the rear link operates. For this reason, the upper rail cannot smoothly move along the lower rail, or frictional noise is caused by friction between components.

DOCUMENTS OF RELATED ART

Patent Documents (Patent Document 1) Korean Patent No. 10-2446336 (published on Sep. 22, 2022)

(Patent Document 2) Korean Patent Application Laid-Open No. 10-2022-0143298 (published on Oct. 25, 2022)

SUMMARY OF THE INVENTION

The present invention has been made in an effort to solve the above-mentioned problem, and an object of the present invention is to provide a walk-in device for a vehicle seat, in which an unlocking device of a link connection structure, which operates in conjunction with a rear link, presses a locking pin to implement a completely unlocked state.

In order to achieve the above-mentioned object, the present invention provides a walk-in device for a vehicle seat, the walk-in device including: a rear link having one end connected to a seat cushion frame by a first hinge shaft, and the other end connected to an upper rail by a second hinge shaft, the rear link being capable of rotating in an unlocking direction about the second hinge shaft; and an unlocking device configured to operate in conjunction with a rotational operation of the rear link and implement an unlocked state by pressing a locking pin by means of operations of a plurality of links.

In addition, the unlocking device may include: a first link having one end connected to the other end of the rear link by a third hinge shaft; a second link having one end connected to the other end of the first link, and the other end connected to the upper rail by a fourth hinge shaft; and a pressing bracket elastically supported by a first elastic member and configured to press the locking pin while rotating in an unlocking direction by being pressed by the second link that operates in conjunction with the first link.

In addition, the pressing bracket may include: an external contact groove assembled to be externally in contact with a fifth hinge shaft connected to the upper rail; and a pressing portion extending in a direction toward the locking pin at an interval with the external contact groove and configured to press the locking pin by being pressed by the second link.

In addition, the pressing portion may be exposed through a through-window of the upper rail so that the second link is pressed.

In addition, an upper end of the locking pin may penetrate an upper portion of the upper rail and be exposed, and when the upper end of the locking pin is pressed downward by the pressing bracket, a locking plate provided below the locking pin may depart from a locking groove of a lower rail, such that a locked state is released.

In addition, when the second hinge shaft, the third hinge shaft, and the first link may be positioned on a straight line as the rear link rotates in the unlocking direction, a maximally pressed state of the locking pin may be implemented by the pressing bracket, such that the locking plate completely departs from the locking groove of the lower rail.

In addition, the first elastic member may be coupled to the fifth hinge shaft, and the first elastic member may elastically support the pressing bracket.

In addition, a gear portion may be provided on an outer-diameter portion of one end of the rear link, a restrained state of the rear link may be implemented when a restraining gear of a restraining device engages with the gear portion, and the gear portion and the restraining gear may be disengaged when the restraining device performs a release operation, such that the rear link is rotated about the second hinge shaft in the unlocking direction by a rotation device that elastically supports the rear link.

In addition, a front link may be provided at an interval from the rear link, one end of the front link may be connected to the seat cushion frame, and the other end of the front link may be connected to the upper rail.

In addition, a portion of the locking pin, which is positioned in the upper rail, may be elastically supported by a second elastic member, the second elastic member may be compressed when the locking pin moves downward, and the second elastic member may be stretched and return the locking pin to an original position when a pressing force of the pressing bracket is eliminated from the locking pin.

According to the present invention, the unlocking device of the link connection structure, which operates in conjunction with the rear link, may press the locking pin, thereby implementing the completely unlocked state.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
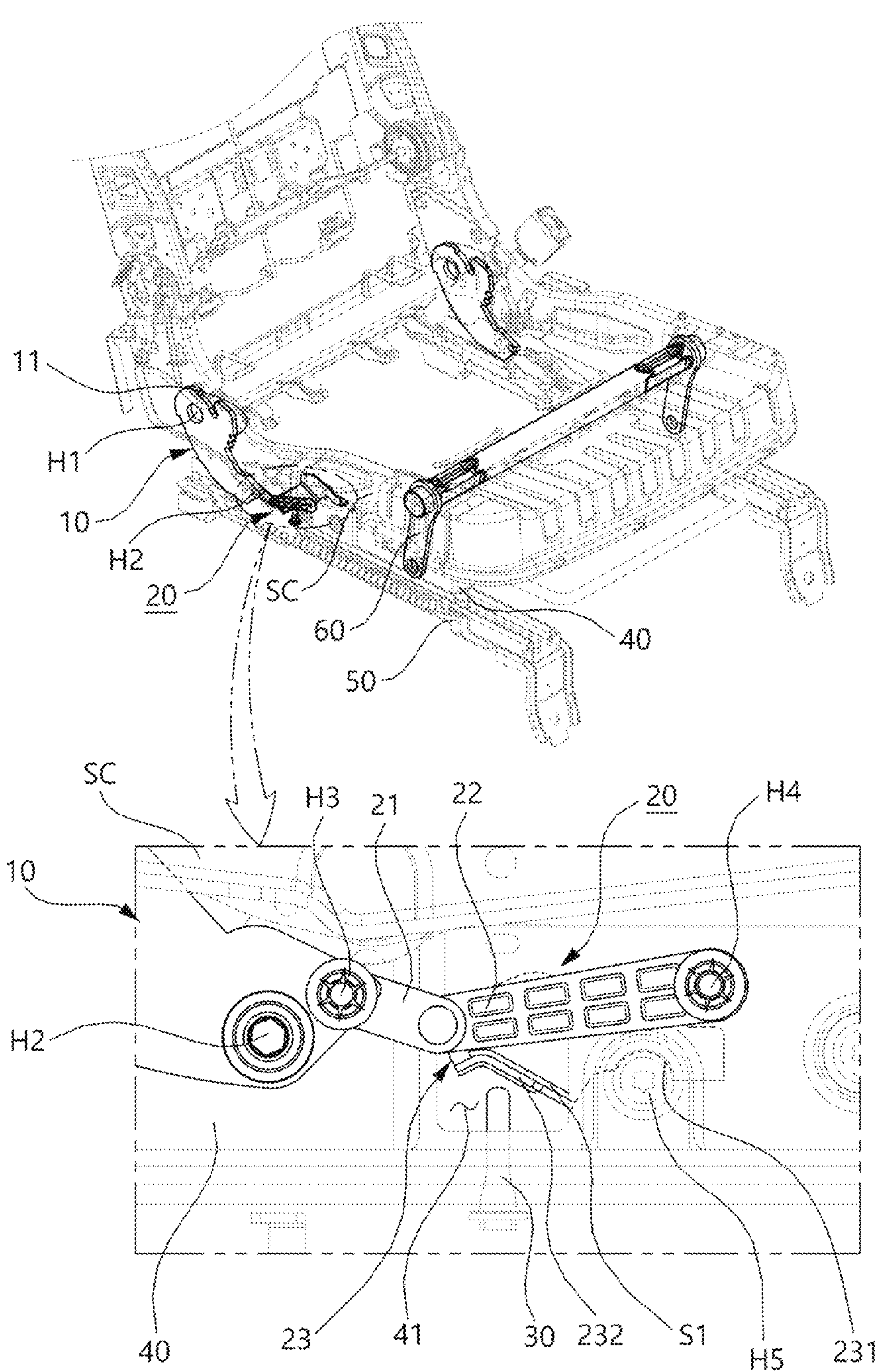
FIG. 1 is a view illustrating an entire configuration of a walk-in device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
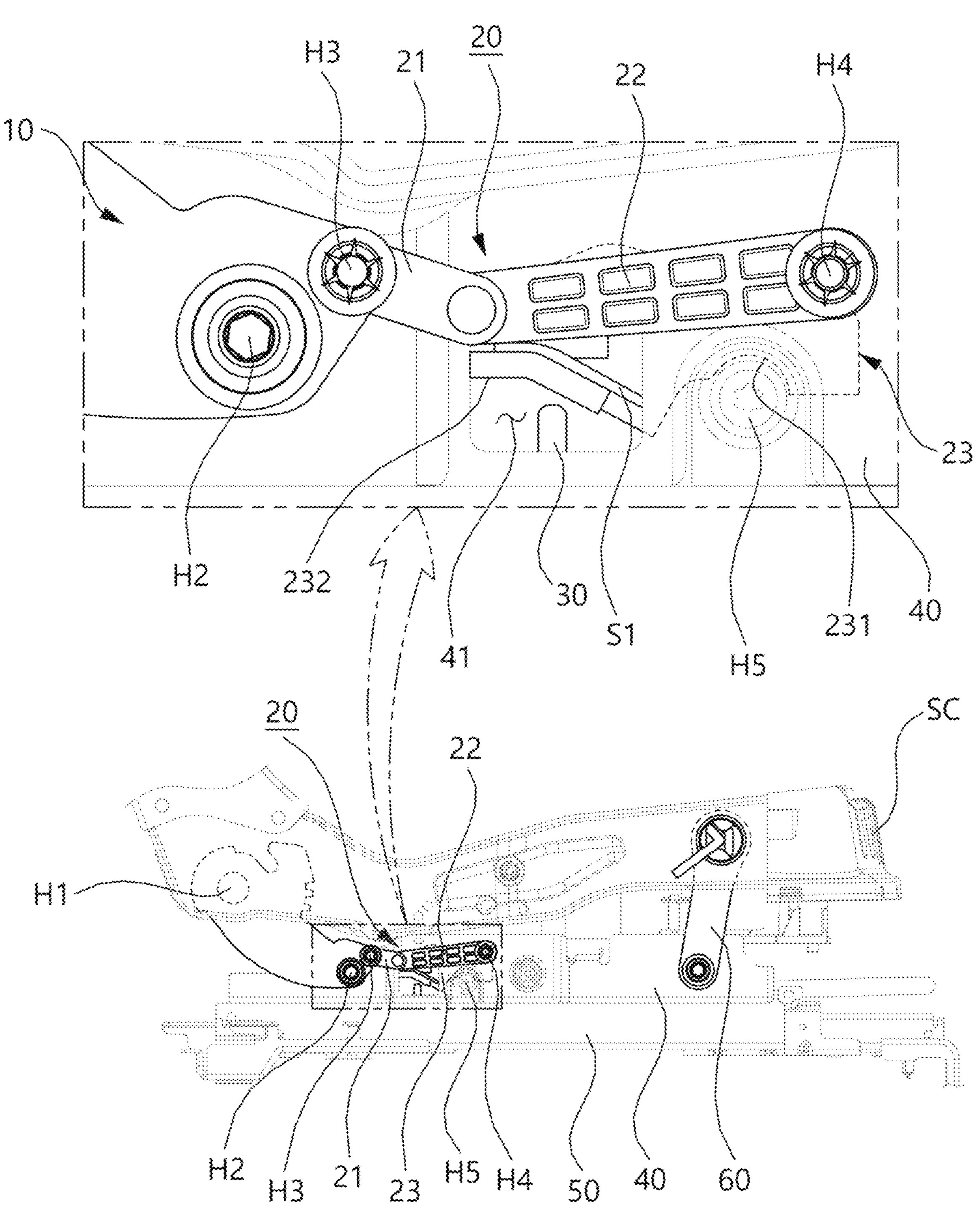
FIG. 2 is a view illustrating a restrained state of a rear link according to the exemplary embodiment of the present invention.
Figure 3:
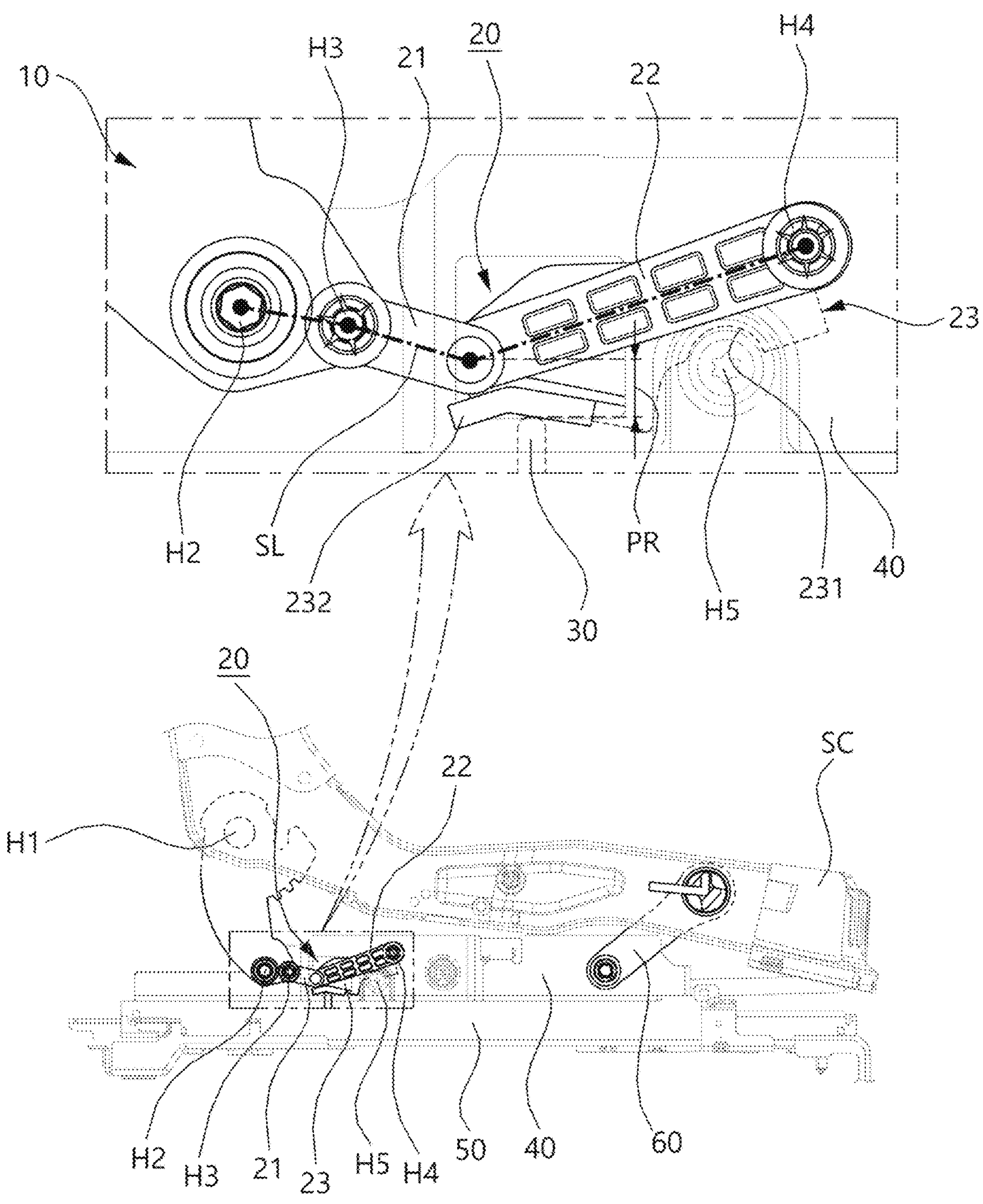
FIG. 3 is a view illustrating a maximum locking-pin pressing state of an unlocking device when the rear link according to the exemplary embodiment of the present invention is unrestrained.

FIG. 1 is a view illustrating an entire configuration of a walk-in device for a vehicle seat according to an exemplary embodiment of the present invention, FIG. 2 is a view illustrating a restrained state of a rear link according to the exemplary embodiment of the present invention, and FIG. 3 is a view illustrating a maximum locking-pin pressing state of an unlocking device when the rear link according to the exemplary embodiment of the present invention is unrestrained.

As illustrated in FIGS. 1 to 3, the walk-in device for a vehicle seat of the present invention may include a rear link 10 configured to be restrained or unrestrained by an operation of a restraining device 70, an unlocking device 20 configured to operate in conjunction with the rear link 10, and a locking pin 30 configured to be pressed by an unlocking device 20.

One end of the rear link 10 may be connected to a seat cushion frame SC by a first hinge shaft H1. The other end of the rear link 10 may be connected to an upper rail 40 by a second hinge shaft H2.

The rear link 10 may be elastically supported by a rotation device 80 such as a spiral spring. When the rear link 10 is unrestrained, the rear link 10 may be rotated in an unlocking direction about the second hinge shaft H2 by an elastic force of the rotation device 80.

The unlocking device 20 may press a locking pin 30 while operating in conjunction with a rotational operation of the rear link 10, such that a locked state of the upper rail 40 and a lower rail 50 locked by the locking pin 30 may be released.

The unlocking device 20 may have a link connection structure. The unlocking device 20 may include a first link 21, a second link 22, and a pressing bracket 23.

One end of the first link 21 may be connected to the other end of the rear link 10 by a third hinge shaft H3.

One end of the second link 22 may be rotatably connected to the other end of the first link 21. The other end of the second link 22 may be connected to the seat cushion frame SC by a fourth hinge shaft H4.

When the rear link 10 rotates in the unlocking direction about the second hinge shaft H2, the first link 21 and the second link 22 connected to the rear link 10 may operate in conjunction with each other. The other end of the first link 21 may press one end of the second link 22 by means of the rotational operation of the rear link 10. One end of the second link 22 may press the pressing bracket 23 by being pressed downward by the first link 21.

The pressing bracket 23 may be elastically supported by a first elastic member S1 such as a torsion spring. The pressing bracket 23 may press an upper end of the locking pin 30 while being rotated in the unlocking direction by being pressed by the second link 22.

The pressing bracket 23 may include an external contact groove 231 and a pressing portion 232.

The external contact groove 231 may be assembled to be externally in contact with a fifth hinge shaft H5 connected to the upper rail 40. The external contact groove 231 may be configured in a semicircle shape that conforms to the fifth hinge shaft H5. The first elastic member S1 may be coupled to the fifth hinge shaft H5.

The pressing portion 232 may extend in the direction toward the locking pin 30 at an interval with the external contact groove 231. The pressing portion 231 may pass through a through-window 41 of the upper rail 40 and exposed.

The pressing portion 231 may press the upper end of the locking pin 30 by being pressed downward by the second link 22.

When a second hinge shaft H1, the third hinge shaft H3, and the first link 21 are positioned on a straight line SL by the rotational operation of the rear link 10, a maximally pressed state PR of the locking pin 30 may be implemented by the pressing bracket 23.

In the maximally pressed state (PR) of the locking pin 30, a locking plate 31 provided below the locking pin 30 may completely depart from a locking groove 51 of the lower rail 50.

A front link 60 may be provided at an interval from the rear link 10. One end of the front link 60 may be connected to the seat cushion frame SC. The other end of the front link 60 may be connected to the upper rail 40.

Figure 4:
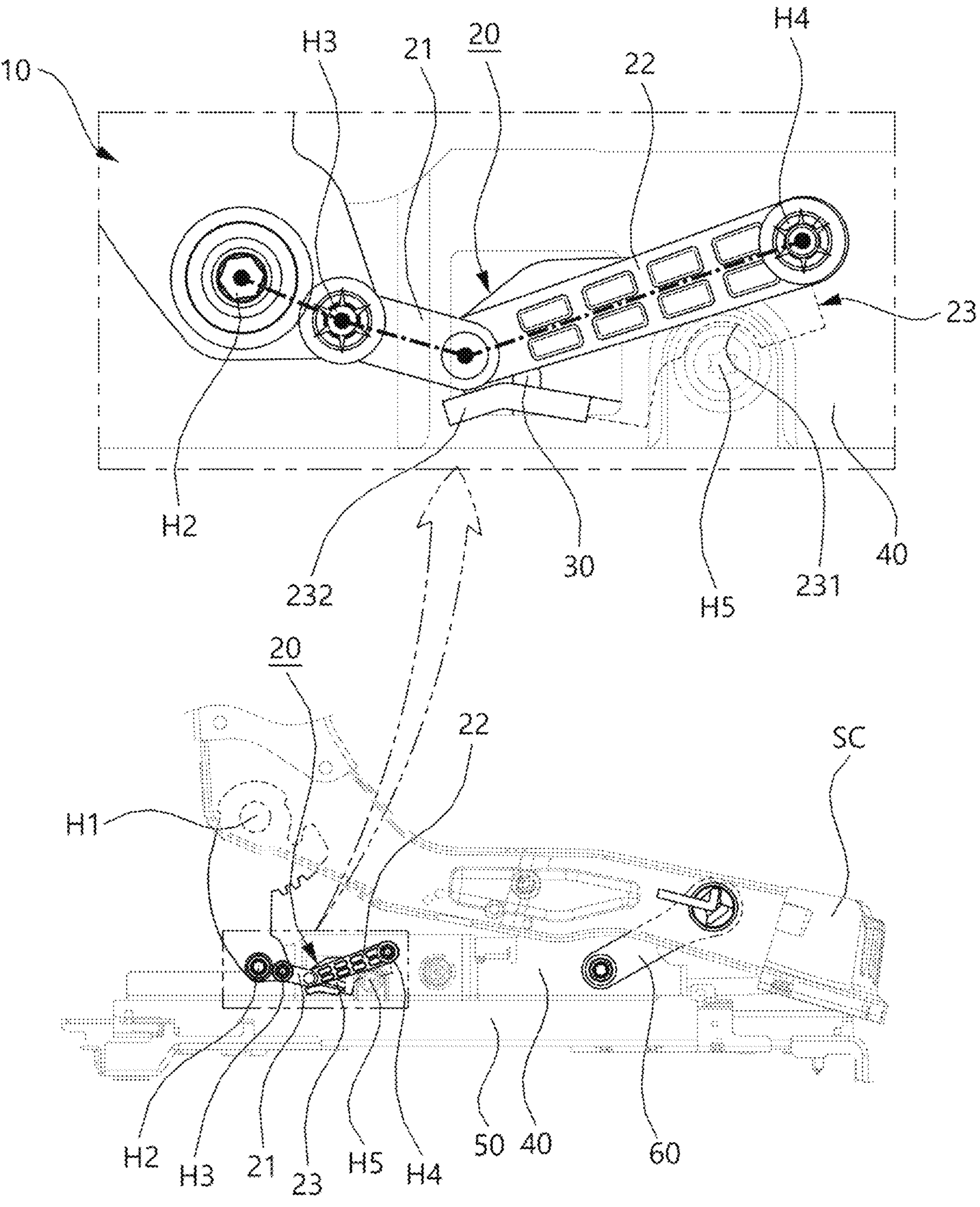
FIG. 4 is a view illustrating an additional rotating state of the rear link in the maximum locking-pin pressing state of the unlocking device according to the exemplary embodiment of the present invention.

FIG. 4 is a view illustrating an additional rotating state of the rear link in the maximum locking-pin pressing state of the unlocking device according to the exemplary embodiment of the present invention.

As illustrated in FIG. 4, the rear link 10 may further additionally rotate in the maximally pressed state PR of the locking pin 30. Because a link operation trajectory on the link connection structure of the unlocking device 20 is small, an additional operation of the first link 21 does not greatly affect the maximally pressed state PR of the locking pin 30 even though the first link 21 additionally operates in conjunction with the additional rotation of the rear link 10.

Figure 5:
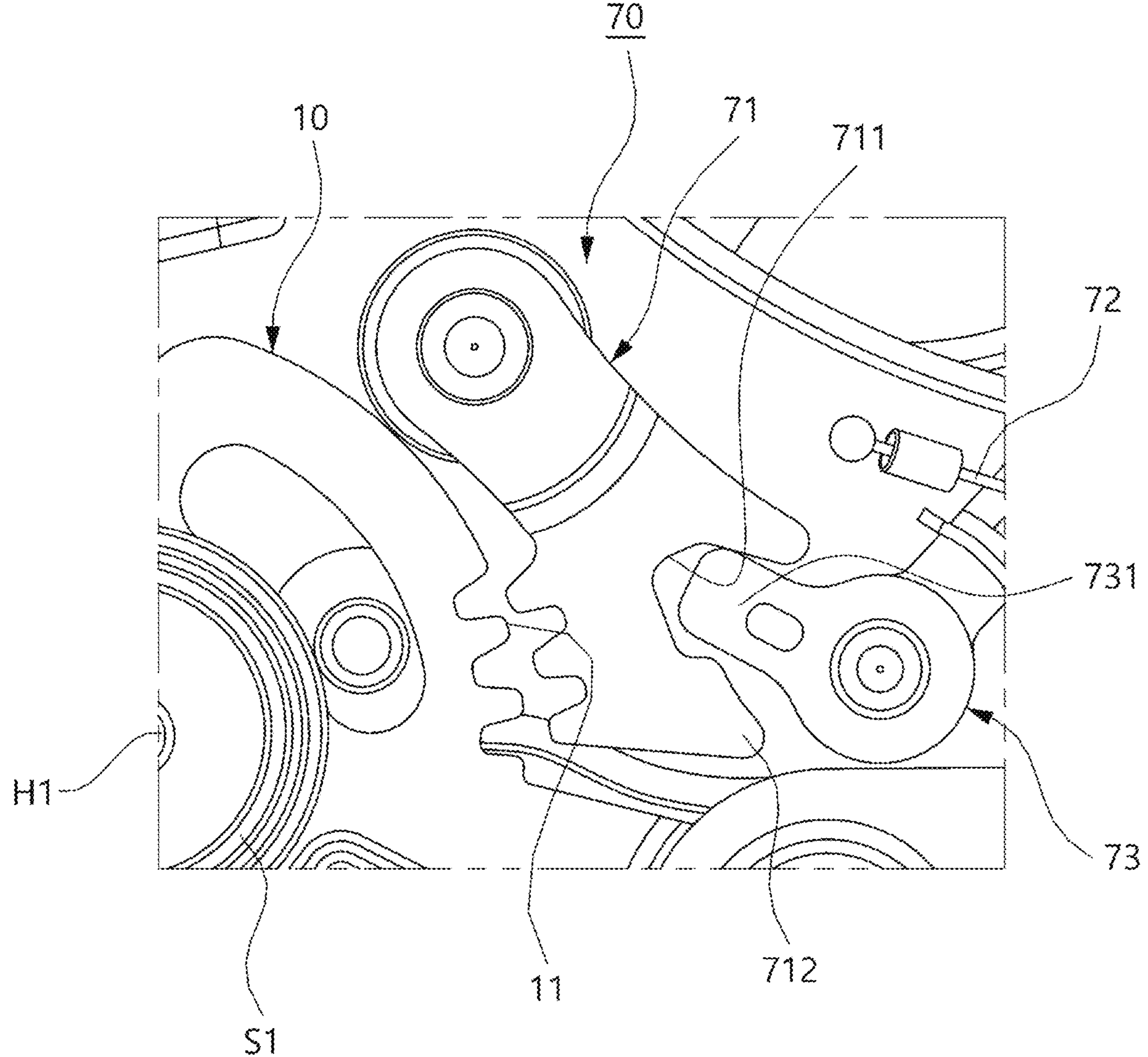
FIG. 5 is a view illustrating a restraining device according to the exemplary embodiment of the present invention.

FIG. 5 is a view illustrating the restraining device according to the exemplary embodiment of the present invention.

As illustrated in FIG. 5, the restraining device 70 may include a restraining gear 71 configured to engage with a gear portion 11 provided at one end of the rear link 10, and a locking lever 73 having a locking portion 731 configured to press a restraining protrusion 712 of the restraining gear 71, when the rear link 10 is restrained, and configured to be inserted into an unrestraining groove 711 of the restraining gear 71 when the rear link 10 is unrestrained.

The locking lever 73 may be connected to a cable 72. The cable 72 may be connected to a drive device (not illustrated) such as an actuator.

For example, when a passenger operates a walk-in switch (not illustrated), the cable 72 may be pulled by an operation of a drive device (not illustrated) such as an actuator, and the locking lever 73 connected to the cable 72 may rotate in an unrestraining direction.

Figure 6:
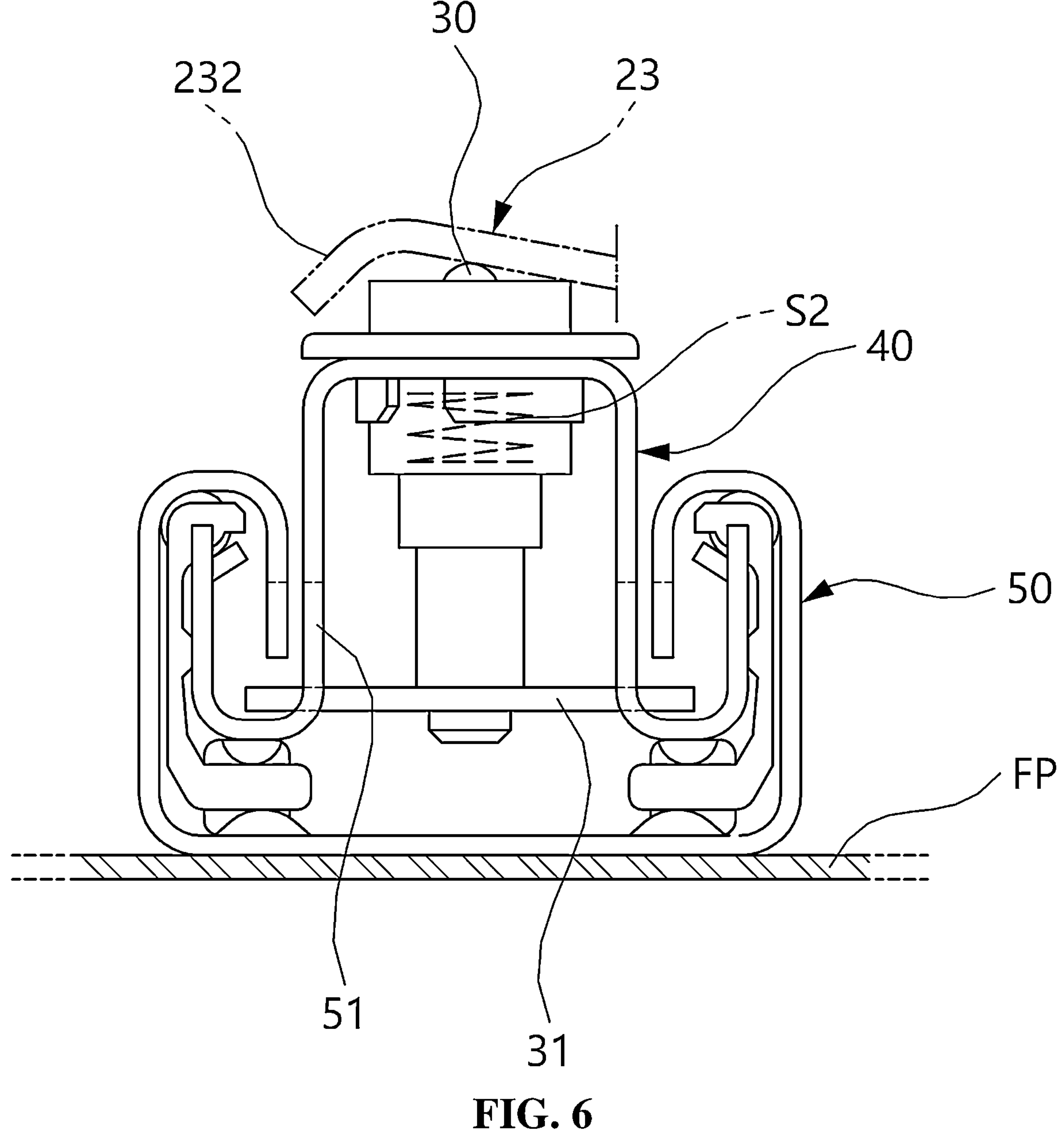
FIG. 6 is a view illustrating an unlocked state of a locking plate provided below a locking pin according to the exemplary embodiment of the present invention.

FIG. 6 is a view illustrating an unlocked state of the locking plate provided below the locking pin according to the exemplary embodiment of the present invention.

As illustrated in FIG. 6, the upper end of the locking pin 30 may penetrate the upper portion of the upper rail 40 and be exposed. The upper end of the locking pin 30 may be pressed downward by the pressing bracket 23.

When the locking pin 30 is pressed, the locking plate 31 provided below the locking pin 30 may depart from the locking groove 51 of the lower rail 50. Therefore, the locked state may be released.

A portion of the locking pin 30, which is positioned in the upper rail 40, may be elastically supported by a second elastic member S2.

The second elastic member S2 may be compressed by being pressed by the locking pin 30 when the locking pin 30 moves downward. When a pressing force of the pressing bracket 23, which presses the locking pin 30, is eliminated in the compressed state of the second elastic member S2, the second elastic member S2 may push the locking pin 30 upward while being stretched, thereby returning the locking pin 30 to an original position.

The lower rail 50 may be connected to a floor panel FP in the vehicle.

Next, an operation of the unlocking device when the rear link rotates will be specifically described.

As illustrated in FIGS. 1 to 3, when the passenger operates the walk-in switch (not illustrated), the rear link 10 may be unrestrained by an unrestraining operation of the restraining device 70. The unrestrained rear link 10 may rotate about the other end by the elastic force of the rotation device 80 such as a spiral spring.

The second hinge shaft H2, the third hinge shaft H3, and the first link 21 may be positioned on the straight line SL as the rear link 10 rotates. The maximally pressed state PR of the locking pin 30 may be implemented by the pressing bracket 23 in the state in which the second hinge shaft H2, the third hinge shaft H3, and the first link 21 are positioned on the straight line SL.

As illustrated in FIG. 4, the operation of the first link 21 does not affect the maximally pressed state PR of the locking pin 30 because the operation of the first link 21 is small even though the first link 21 operates in conjunction with the additional rotation of the rear link 10.

Next, an operation of the restraining device will be described specifically.

As illustrated in FIG. 5, the locking portion 731 of the locking lever 73 presses a restraining protrusion 712 of the restraining gear 71, such that the restraining gear 71 may engage with the gear portion 11 of the rear link 10. Therefore, the rear link 10 may be restrained.

The drive device (not illustrated), such as an actuator, may pull the cable 72 when the passenger operates the walk-in switch (not illustrated) in the state in which the restraining gear 71 engages with the gear portion 11 of the rear link 10.

As the cable 72 is pulled, the locking lever 73 connected to the cable 72 may rotate in the unlocking direction.

As the locking lever 73 rotates in an unrestraining direction, the locking portion 731 of the locking lever 73, which has pressed the restraining protrusion 712, may be inserted into the unrestraining groove 711 of the restraining gear 71.

When the locking portion 731, which has pressed the restraining gear 71, is inserted into the unrestraining groove 711 of the restraining gear 71, the restraining gear 71, which has engaged with the gear portion 11, may be disengaged.

As the restraining gear 71 and the gear portion 11 of the rear link 10 are disengaged, an unrestrained state may be implemented in which the rear link 10 may freely rotate.

Next, an operation of the locking pin will be specifically described.

As illustrated in FIG. 6, the pressing bracket 23 may press the upper end of the locking pin 30 as the unlocking device 20 operates in conjunction with the rotational operation of the rear link 10. Therefore, the locking pin 30 may move downward while pressing the second elastic member S2.

As the locking pin 30 moves downward, the locking plate 31, which is provided below the locking pin 30 inserted into the locking groove 51 of the lower rail 50, may depart from the locking groove 51, such that the completely unlocked state of the locking pin 30 may be implemented.

In the unlocked state, the upper rail 40 may freely move along the lower rail 50.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A walk-in device for a vehicle seat, the walk-in device comprising:

a rear link having one end connected to a seat cushion frame by a first hinge shaft, the rear link having another end connected to an upper rail by a second hinge shaft, the rear link being capable of rotating in an unlocking direction of the rear link about the second hinge shaft; and an unlocking device to operate in conjunction with a rotational operation of the rear link and to implement an unlocked state by pressing a locking pin by operations of a plurality of links, wherein the unlocking device comprises:

a first link having one end connected to the another end of the rear link by a third hinge shaft;

a second link having one end connected to another end of the first link, the second link having another end connected to the upper rail by a fourth hinge shaft; and a pressing bracket elastically supported by a first elastic member and configured to press the locking pin while rotating in an unlocking direction of the pressing bracket by being pressed by the second link that operates in conjunction with the first link, wherein the pressing bracket comprises:

an external contact groove defined to be externally in contact with a fifth hinge shaft connected to the upper rail; and a pressing portion extending in a direction toward the locking pin while being spaced apart from the external contact groove, the pressing portion being configured to press the locking pin by being pressed by the second link.

2. The walk-in device of claim 1, wherein the pressing portion is exposed through a through-window of the upper rail to enable pressing of the second link.

3. The walk-in device of claim 1, wherein an upper end of the locking pin penetrates an upper portion of the upper rail and is exposed, and wherein when the upper end of the locking pin is pressed downward by the pressing bracket, a locking plate disposed below the locking pin is configured to depart from a locking groove of a lower rail, such that a locked state is released.

4. The walk-in device of claim 3, wherein when the second hinge shaft, the third hinge shaft, and the first link are positioned on a straight line as the rear link rotates in the unlocking direction of the rear link, the locking pin is configured to be maximally pressed by the pressing bracket, such that the locking plate completely departs from the locking groove of the lower rail.

5. The walk-in device of claim 1, wherein the first elastic member is coupled to the fifth hinge shaft, the first elastic member being configured to elastically support the pressing bracket.

6. The walk-in device of claim 1, wherein a gear portion is disposed on an outer-diameter portion of the one end of the rear link, wherein a restraining gear of a restraining device is configured to engage with the gear portion to implement a restrained state of the rear link, and wherein the gear portion and the restraining gear are configured to be disengaged when the restraining device performs a release operation, such that the rear link is rotated about the second hinge shaft in the unlocking direction of the rear link by a rotation device that elastically supports the rear link.

7. The walk-in device of claim 1, wherein a front link is disposed at an interval from the rear link, wherein one end of the front link is connected to the seat cushion frame, and wherein another end of the front link is connected to the upper rail.

8. The walk-in device of claim 1, wherein a portion of the locking pin, which is positioned in the upper rail, is elastically supported by a second elastic member, wherein the second elastic member is configured to be compressed when the locking pin moves downward, and wherein the second elastic member is configured to be stretched and to return the locking pin to an original position when a pressing force of the pressing bracket is eliminated from the locking pin.

9. A walk-in device for a vehicle seat, the walk-in device comprising:

a rear link having one end connected to a seat cushion frame by a first hinge shaft, the rear link having another end connected to an upper rail by a second hinge shaft, the rear link being capable of rotating in an unlocking direction of the rear link about the second hinge shaft; and an unlocking device to operate in conjunction with a rotational operation of the rear link and to implement an unlocked state by pressing a locking pin by operations of a plurality of links, wherein a gear portion is disposed on an outer-diameter portion of one end of the rear link, wherein a restraining gear of a restraining device is configured to engage with the gear portion to implement a restrained state of the rear link, and wherein the gear portion and the restraining gear are configured to be disengaged when the restraining device performs a release operation, such that the rear link is rotated about the second hinge shaft in the unlocking direction of the rear link by a rotation device that elastically supports the rear link.

10. A walk-in device for a vehicle seat, the walk-in device comprising:

a rear link having one end connected to a seat cushion frame by a first hinge shaft, the rear link having another end connected to an upper rail by a second hinge shaft, the rear link being capable of rotating in an unlocking direction of the rear link about the second hinge shaft; and an unlocking device to operate in conjunction with a rotational operation of the rear link and to implement an unlocked state by pressing a locking pin by operations of a plurality of links, wherein the unlocking device comprises:

a first link having one end connected to the another end of the rear link by a third hinge shaft;

a second link having one end connected to another end of the first link, the second link having another end connected to the upper rail by a fourth hinge shaft; and a pressing bracket elastically supported by a first elastic member and configured to press the locking pin while rotating in an unlocking direction of the pressing bracket by being pressed by the second link that operates in conjunction with the first link, wherein a portion of the locking pin, which is positioned in the upper rail, is elastically supported by a second elastic member, wherein the second elastic member is configured to be compressed when the locking pin moves downward, and wherein the second elastic member is configured to be stretched and to return the locking pin to an original position when a pressing force of the pressing bracket is eliminated from the locking pin.

* * * * *